Patented July 2, 1946

2,403,019

UNITED STATES PATENT OFFICE 2,403,019

INHIBITION OF ACID FADING ON CELLULOSE ACETATE WITH MELAMINE RESIN

Henry Charles Olpin and Sydney Alfred Gibson, Spondon, near Derby, England, assignors to British Celanese Limited, London, England, a company of Great Britain No Drawing. Application February 9, 1944, Serial No. 521,661. In Great Britain February 22, 1943

10 Claims. (Cl. 8—61)

This invention relates to colourations and has as its primary object to protect colourations on textile materials produced by certain dyestuffs against change of shade due to certain chemical agencies.

It is known that certain dyeings which are otherwise satisfactory, undergo change of shade as a result of exposure to an atmosphere containing the combustion products of coal gas. This disadvantage is found, for example, in the case of dyeings on materials of cellulose acetate or other ester or ether of cellulose by dyestuffs of the amino-anthraquinone series, especially 1-amino-4-oxy- and 1:4-diamino-anthraquinones including 1:4-diamino-anthraquinones in which one or both amino groups carry an alkyl (including hydroxy alkyl) substituent.

We have now found that dyeings which are normally unstable towards the combustion products of coal gas in the sense of undergoing a change of shade when exposed to atmosphere containing such products, for instance the atmospheres of rooms which have been heated or illuminated with coal gas, can be rendered more resistant to such agencies by the presence of certain condensation products of aldehydes with organic bases containing a plurality of basic nitrogenous groups. Thus, some increase in resistance can be obtained by the presence of condensation products of aldehydes, especially formaldehyde, with diamines, for example ethylene diamine and hexamethylene diamine, or with diazine derivatives such as piperazine, while an outstanding increase of resistance can be obtained by the use of condensation products of an aldehyde such as formaldehyde with an amino-triazine such as melamine.

In forming the condensation products various proportions of aldehyde to organic base may be employed. Preferably the molecular ratio of aldehyde to base should be at least 2:1 but useful products can be obtained using a lower ratio, for example 1:1. On the other hand, it is usually preferable for the ratio of aldehyde to base to be higher than 2:1, for example 3:1 or 4:1 up to 6:1 or even higher.

The invention includes applying the condensation products to materials dyed with a dyestuff unstable to coal gas combustion products, as well as applying the condensation product to such materials before or during colouration with such a dyestuff. The condensation product may represent any stage of condensation of the aldehyde and base, from condensation products which are still water-soluble up to fully condensed water-insoluble infusible condensation products such as are obtainable by a heat treatment of products representing an earlier stage of condensation. Instead of applying the condensation product as such, the components from which it is formed, with or without a catalyst or potential catalyst (of which examples are given below) may be applied to the material, and condensation effected on the material at an elevated temperature. Condensation can be effected on the material impregnated with the components of the condensation product by exposure to the vapours of a volatile catalyst. The best results, however, have been obtained by effecting at least a partial condensation of the components, for example in an aqueous medium, before application to the material. When preliminary condensation is carried out beyond the stage of water-solubility the condensation product can be applied in mildly acid solution. Solutions of pH value from 4 to 5 will generally be found suitable.

Alkaline catalysts, e. g. ammonia, hexamethylene tetramine or an alkaline carbonate, may be employed in the condensation; or this can be effected in neutral solution; or an acid catalyst may be employed. Strong mineral acids, e. g. hydrochloric acid, sulphuric acid and phosphoric acid, are preferably avoided on account of the danger of damaging the materials; weak mineral acids such as boric acid are free from this disadvantage as are carboxylic acids of moderate strength, such as tartaric acid. Potential acids, i. e. substantially neutral substances which become acid when heated, for instance ammonium tartrate and other salts of a volatile base with a less volatile acid, may also be employed.

The application of the condensation product or its components can conveniently be made by a bath treatment, excess of the solution being removed by passage of the material between squeeze rolls. The amount of the condensation product remaining in the materials after they have been impregnated with the resin solution and dried may be e. g. from about 0.5% to about 1 or 2% on the initial weight of the dry materials. Other methods of application are available. Thus, for example, the treating agent may be applied to loose fibres of the textile material or to yarn in hank form or on the bobbin, and the material may subsequently be made up into fabrics and dyed with a dyestuff of the kind referred to above; or the material may be so dyed before or during application of the condensation product. In the case of textile materials made of or containing artificial fibres formed by spinning a dope containing the fibre-forming base, the condensation product may be incorporated in the dope. The invention includes materials having a basis of a cellulose ester or ether, containing a condensation product of the kind referred to and dyed with a dyestuff normally unstable to coal-gas combustion products, as well as compositions containing such dyestuffs and condensation products, for example in conjunction with dispersing agents or other dye-assistants.

The drying of the materials impregnated with the aldehyde-polyamino base-condensation product may be effected at temperatures below 100° C., e. g. temperatures of about 50 or 60 or 70 or 80° C. When however maximum resistance to aqueous treatments is required, it is preferable to subject the impregnated materials to higher temperatures e. g. 120–130 or 140° C.

As indicated above, the invention is of particular importance in connection with the colouration of materials having a basis of a cellulose ester or ether with dispersed insoluble dyestuffs unstable to coal-gas combustion products, and especially with dyestuffs of the 1:4-diamino-anthraquinone series. Such dyestuffs yield violet to blue shades of a fastness to light which is difficult to attain otherwise, and it is a very important advantage of the present invention that it enables such dyestuffs to be used without danger of change of shade occurring owing to the instability referred to.

The invention may be illustrated in connection with the protection of dyeings of the kind referred to upon a cellulose acetate fabric by means of a melamine-formaldehyde condensation product.

According to one method of carrying out the invention, a condensation product is formed by adding 63 parts of powdered melamine to 225 parts of 40% aqueous formaldehyde at a temperature of about 50° C. and maintaining the mixture at a temperature of about 50 to 55° C. for one hour. Any slight residue is then filtered off and the clear liquor is acidified with 20 parts of 85% formic acid and poured into 6000 parts of water. The resulting slightly turbid solution, having a pH value of 4 to 5 is padded on to a cellulose acetate fabric dyed with a dispersion of 1-methylamino-4-ethanolamino - anthraquinone, the padding rolls being adjusted to leave in the material about its own weight of the resin solution. The material is dried at a temperature of about 60 to 70° C., or if maximum resistance to aqueous treatment is required, the material after drying is heated for about 20 minutes at about 130° C. In both cases the dyeing shows a high resistance to atmospheres containing coal-gas combustion products. The heat treatment can be effected without material change in the shade of the dyestuff. Instead of applying the condensation product to the dyed material the material may be treated before dyeing in just the same way as has been described and may subsequently be dyed with the dispersed dyestuff. The first method, however, is to be preferred since once the fabric has been treated with the condensation product and dried, and especially when a further heat treatment has been applied, it becomes more difficult to wet than the untreated fabric, in consequence of which dyeing takes longer.

Instead of the dyestuff specified other dyestuffs of the 1:4-diamino-anthraquinone series may be employed, for example 1:4-diamino-anthraquinone itself, 1-amino-4-methylaminoanthraquinone, 1:4-dimethylamino-anthraquinone, 1:4-diethanolamino-anthraquinone, 1-methylamino-4-ethanolamino-anthraquinone, 1-amino-4-phenylamino-anthraquinone, and 1-methylamino-4-phenylamino-anthraquinone.

The invention has been described with particular reference to the treatment of materials having a basis of cellulose acetate but it is also applicable to other textile materials, especially materials having a basis of an ester or ether of cellulose. Among such materials are: cellulose propionate, cellulose butyrate, cellulose acetate-propionate, cellulose acetate-butyrate, ethyl cellulose, benzyl cellulose and ethyl cellulose acetate. Materials made of or containing fibre-forming polymers of unsaturated compounds, for example polystyrene, polymethylmethacrylate, polyvinylidine chloride and co-polymers of two or more such monomers, for example polyvinyl chloride-acetate, can also be treated by the process of the invention. This process is also applicable to the treatment of mixed materials, for example materials containing artificial fibres such, for example, as those referred to above in admixture with fibres of natural origin.

As indicated above, the best results have been obtained using condensation products of formaldehyde with melamine. Other condensation products of similar constitution may, however, be employed. In forming such condensation products formaldehyde may be replaced by other aldehydes capable of undergoing condensation with amino groups, for example acetaldehyde, benzaldehyde or furfural, and in place of melamine other cyclic bases containing nitrogen in the ring together with one or more amino groups may be employed, for example ammeline, ammelide, and derivatives of these bases or of melamine, in which a part of the hydrogen of the amino groups is replaced by hydrocarbon residue, especially alkyl groups.

Having described our invention, what we desire to secure by Letters Patent is:

1. Processes for improving the fastness to the combustion products of coal gas of dyeings on textile materials, films and the like, having a basis of an organic derivative of cellulose dyed with a substantially water insoluble dye selected from the group consisting of 1-amino-4-oxy-anthraquinone dyes and 1:4-diamino-anthraquinone dyes, which comprise impregnating the textile materials with a water-insoluble resinous condensation product of an aldehyde with an amino-triazine in an amount at most 2% of the initial weight of the dry materials.

2. Processes for improving the fastness to the combustion products of coal gas of dyeings on textile materials, films and the like, having a basis of cellulose acetate dyed with 1-methylamino-4-ethanolamino-anthraquinone, which comprise impregnating the textile materials with a condensation product of formaldehyde with melamine in an amount of from 0.5 to 2% of the weight of the dry materials.

3. Processes for improving the fastness to the combustion products of coal gas of dyeings on textile materials, films and the like, having a basis of cellulose acetate dyed with 1-amino-4-phenylamino - anthraquinone, which comprise impregnating the textile materials with a condensation product of formaldehyde with melamine in an amount of from 0.5 to 2% of the weight of the dry materials.

4. Processes for improving the fastness to the combustion products of coal gas of dyeings on textile materials, films and the like, having a basis of cellulose acetate dyed with 1-amino-4-methylamino-anthraquinone, which comprise impregnating the textile materials with a condensation product of formaldehyde with melamine in an amount of from 0.5 to 2% of the weight of the dry materials.

5. Textile materials, films and the like having a basis of an organic derivative of cellulose, dyed with a substantially water-insoluble dye selected from the group consisting of 1-amino-4-oxyanthraquinone dyes and 1:4-diamino anthraquinone dyes, said dyed materials having improved resistance to combustion products of coal gas owing to the presence in the materials of a small proportion, at most 2% of the initial weight of the dry materials, of a water-insoluble resinous condensation product of an aldehyde with an amino-triazine.

6. Textile materials, films and the like having a basis of cellulose acetate, dyed with a substantially water-insoluble dye selected from the group consisting of 1-amino-4-oxyanthraqinone dyes and 1:4-diamino anthraquinone dyes, said dyed materials having improved resistance to combustion products of coal gas owing to the presence in the materials of a small proportion, at most 2% of the initial weight of the dry materials, of a water-insoluble resinous condensation product of an aldehyde with an amino-triazine.

7. Textile materials, films and the like having a basis of an organic derivative of cellulose, dyed with a substantially water-insoluble dye selected from the group consisting of 1-amino-4-oxyanthraquinone dyes and 1:4-diamino anthraquinone dyes, said dyed materials having improved resistance to combustion products of coal gas owing to the presence in the materials of from 0.5 to 2% of the initial weight of the dry materials, of a water-insoluble resinous condensation product of an aldehyde with an amino-triazine.

8. Textile materials, films and the like having a basis of cellulose acetate, dyed with a substantially water-insoluble dye selected from the group consisting of 1-amino-4-oxyanthraquinone dyes and 1:4-diamino anthraquinone dyes, said dyed materials having improved resistance to combustion products of coal gas owing to the presence in the materials of from 0.5 to 2% of the initial weight of the dry materials, of a water-insoluble resinous condensation product of an aldehyde with an amino-triazine.

9. Textile materials, films and the like having a basis of cellulose acetate, dyed with 1-methylamino-4-ethanolamino-anthraquinone, said dyed materials having improved resistance to combustion products of coal gas owing to the presence in the materials of from 0.5 to 2% of the initial weight of the dry materials, of a water-insoluble resinous condensation product of formaldehyde with melamine.

10. Textile materials, films and the like having a basis of cellulose acetate, dyed with 1-amino-4-phenylamino-anthraquinone, said dyed materials having improved resistance to combustion products of coal gas owing to the presence in the materials of from 0.5 to 2% of the initial weight of the dry materials, of a water-insoluble resinous condensation product of formaldehyde with melamine.

HENRY CHARLES OLPIN.
SYDNEY ALFRED GIBSON.